Sept. 21, 1965  
C. R. SMALL  
3,207,055  
AUTOMOTIVE DIAGNOSTIC SYSTEM WITH  
AUTOMATIC VENTILATION  
Filed Nov. 30, 1962

United States Patent Office 3,207,055
Patented Sept. 21, 1965

3,207,055
AUTOMOTIVE DIAGNOSTIC SYSTEM WITH AUTOMATIC VENTILATION
Charles R. Smail, Woodbury Heights, N.J., assignor to Socony Mobil Oil Company, Inc., a corporation of New York
Filed Nov. 30, 1962, Ser. No. 241,326
4 Claims. (Cl. 98—33)

The present invention is used to ventilate an automotive diagnostic center, which is designed to completely test and check many automotive vehicles in a short period of time. This diagnostic center is disclosed in the copending application Serial No. 241,214 of George B. Myrtetus and Charles H. Pancoast entitled Vehicle Diagnostic System, filed on the same day as the present application, and assigned to the same assignee as the present application. The copending application Serial No. 241,214 has been abandoned in favor of a continuation-in-part application Serial No. 276,702 of George B. Myrtetus and Charles H. Pancoast entitled Automotive Vehicle Serving, filed on April 30, 1963, and assigned to the same assignee as the present application. The continuation-in-part application Serial No. 276,702 contains substantially all of the disclosure of the application Serial No. 241,214. As disclosed in this copending application, the diagnostic center comprises a drive-through diagnostic bay in which test equipment is located. The test equipment is positioned to be operatively connected to the vehicle at a plurality of test stations spaced along the driveway of the diagnostic bay. At one station where the engine of the vehicle is tested, the rear wheels of the vehicle are engaged by the rollers of a dynamometer. The rollers of the dynamometer are positioned in the driveway of the drive-through bay so that the vehicle may be driven to the position in which its rear wheels are engaged by the dynamometer rollers. Additional test equipment is also connected to the vehicle at this test station. This additional test equipment includes an engine tachometer, which is connected to the ignition system of the vehicle. The engine tachometer in response to an electric signal received from the ignition system of the vehicle provides an indication of the revolutions per minute of the engine and produces an output signal representing this value. The ventilation system of the present invention is controlled automatically in response to the output signal of the engine tachometer. The ventilation system comprises a pair of blowers which bring temperature-controlled air into the diagnostic bay and a pair of fans which exhaust air from the diagnostic bay. A control device normally causes the blowers to run at low speed and in response to an output signal from the engine tachometer causes the blowers to run at high speed. One of the exhaust fans runs continuously and the other exhaust fan, which is controlled by the control device, is maintained normally shut off by the control device. The control device, in response to receiving a signal from the engine tachometer indicating that the vehicle engine is running, turns the second fan on. Thus the rate at which fresh air is brought into the diagnostic bay and air is exhausted from the diagnostic bay is automatically increased in response to the running of the vehicle engine.

Accordingly, it is an object of the present invention to provide an improved ventilation system for an automotive diagnostic center designed to test a large number of automotive vehicles in a short period of time.

Another object of the present invention is to provide a ventilation system for an automotive diagnostic center, which ventilation system automatically increases the rate at which fresh air is brought into the testing area and air is exhausted from the testing area when such increased ventilation is needed.

A further object of the present invention is to provide an automatically controlled ventilation system for a drive-through automotive diagnostic bay designed to thoroughly test a large number of automotive vehicles in a short period of time.

Further objects and advantages of the present invention will become readily apparent as the following detailed description of the present invention unfolds and when taken in conjunction with the drawings, wherein.

Figure 1:
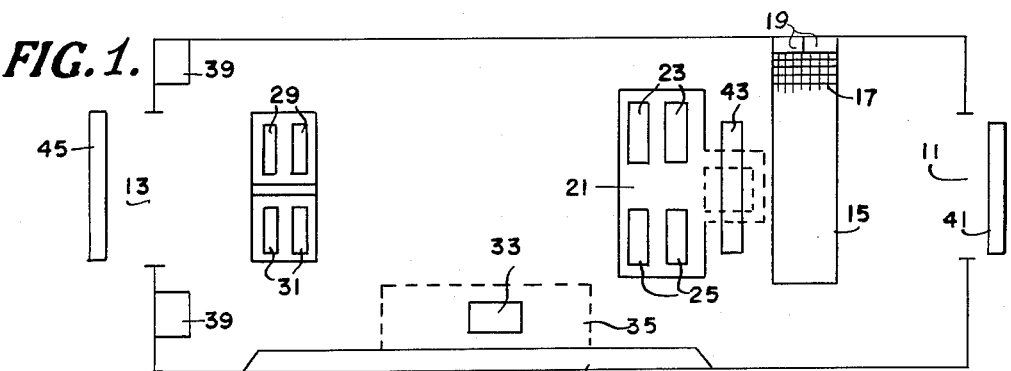
FIG. 1 is a schematic illustration of the layout or floor plan of the diagnostic bay in which the ventilation system of the present invention is used.

As illustrated in FIG. 1, the drive-through diagnostic bay has an entrance 11 and an exit 13. Automobiles to be diagnosed are driven into the bay through the entrance 11, are tested and diagnosed, and are driven out the exit 13. An exhaust duct 15 is provided under the floor of the drive-through bay. The duct 15 communicates with the bay through a large opening in the floor of the bay about ten feet inside of the entrance 11. This opening is covered by a grate 17 which is strong enough to support the automobiles which will be driven over it. The duct 15 is connected to two vertically disposed ducts 19 on the side wall of the drive-through bay. The ducts 19 lead to exhaust fans, which draw air from the bay through the grate 17 and through the ducts 15 and 19 and exhaust the air outside. The air exhausted in this manner will carry out the exhaust gases of the automobiles and keep the air in the test bay fresh. A Maxwell dynamometer 21 is also mounted in the floor of the test bay. The Maxwell dynamometer 21 has two pairs of rollers 23 and 25 for receiving the right and left wheels of an automotive vehicle. These pairs of rollers are positioned in the floor of the test bay approximately twenty-one feet from the entrance 11. The bay also has a Merrill wheel aligner 27 which has pairs of rollers 29 and 31 located in the floor of the test bay. The rollers 29 and 31 are positioned twenty-five feet forward of the rollers 23 and 25 of the dynamometer 21 towards the exit 13 and are spaced to receive the right and left wheels of the automotive vehicles to be tested. Suspended from overhead in the bay is an instrument carriage 33 which can be moved by its suspension system anywhere within the dotted line 35. An instrument and control panel 37 mounted on the left hand wall of the test bay is located approximately in the middle of the test bay between the Maxwell dynamometer 21 and the Merrill wheel aligner 27. Two blowers 39 are located on opposite sides of the exit 13 within the test bay. These blowers provide a supply of fresh air to the test bay and are used to maintain the temperature within the bay at the desired level.

The entrance 11 and the exit 13 are provided with doors, which are opened and closed by positioning mechanisms. The positioning mechanism for the door in the entrance 11 will raise this door to its open position in response to a vehicle running over a treadle 41 positioned across the driveway outside the entrance 11. The positioning mechanism for the entrance door will close the entrance door in response to a vehicle running over a treadle 43 positioned inside of the entrance 11 across the floor of the diagnostic bay between the entrance 11 and the rollers 23 and 25 of the dynamometer 21. The treadle 43 is positioned sufficiently far enough from the entrance 11 for any vehicle which has its front wheels on the treadle 43 to be out of the entrance 11. The entrance 11 is provided with a photocell adapted to sense any vehicle or other obstruction in the entrance 11 and apply a signal indicating the presence of such an obstruction in the entrance 11 to the positioning mechanism for the entrance door. In response to such a signal from this photocell the positioning mechanism for the entrance door will hold the entrance door in its raised position even if a vehicle is on the treadle 43. The positioning mechanism for the door in the exit 13 will raise this door to its open position in response to the actuation of a switch and will lower the exit door to its closed position in response to a vehicle running over a treadle 45 positioned across the vehicle driveway outside the exit 13. The exit 13 is provided with a photocell to sense any vehicle or other obstruction in the exit 13 and apply a signal indicating the presence of such an obstruction to the positioning mechanism for the exit door. In response to receiving such a signal from this photocell the positioning mechanism for the exit door will hold the exit door in its open position regardless of whether the vehicle is on the treadle 45 or not.

Figure 2:
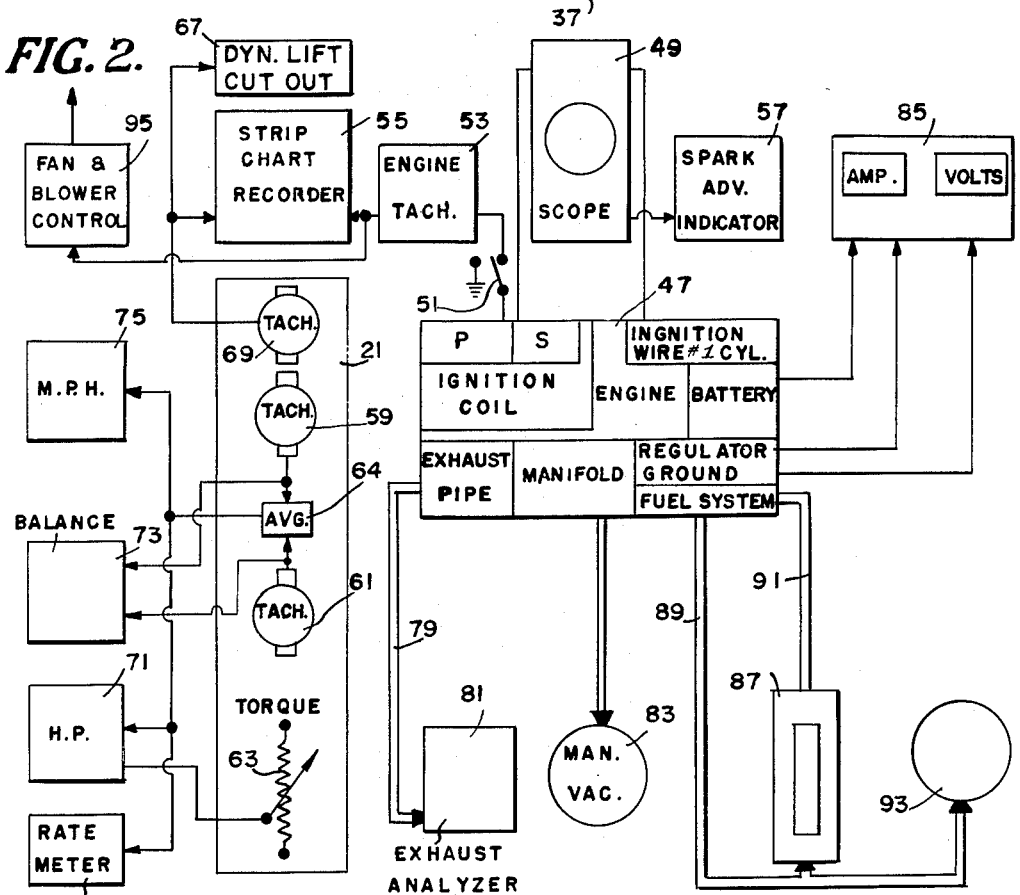
FIG. 2 is a block diagram illustrating how equipment in the diagnostic bay is connected to the engine of a vehicle under diagnosis.

FIG. 2 is a block diagram showing the test equipment that is connected to an automotive vehicle during the test procedure when the automotive vehicle is tested with its rear wheels on the rollers of the dynamometer and illustrating how the equipment is connected to the automotive vehicle. The engine of the vehicle is designated by the reference number 47. As shown in FIG. 2 an engine scope 49 has one lead connected to the high voltage output of the ignition coil and another lead connected to the ignition wire of the No. 1 cylinder of the engine. The details of the engine scope are disclosed in Patent No. 2,608,093 invented by Alfred E. Traver and issued on August 26, 1952, and in the copending application Serial No. 172,016 entitled "Analyzer for Internal Combustion Engines" filed on February 8, 1962 and invented by Alfred E. Traver. As disclosed in the Traver patent, the engine scope simultaneously depicts a plurality of vertically separated horizontal waveforms, one for each cylinder of the engine and synchronized with the functioning of such cylinder. With the engine scope, a diagnostician can determine the dwell for each cylinder; he can determine whether the spark plug and the ignition wire for each cylinder are in satisfactory condition; he can determine whether the coil, the points and the condenser are in satisfactory condition; and he can determine whether the distributor lobes, the distributor drive and the distributor bearings are in satisfactory condition.

As shown in FIG. 2, the movable pole of a switch 51 is connected to the primary winding of the ignition coil of the engine 47. In one position the switch 51 connects the primary winding to ground, shorting it out, and in the other position the switch 51 connects the ignition coil primary to the input of an engine tachometer 53. When the switch 51 connects the primary winding of the ignition coil to the tachometer 53, the tachometer 53, in response to pulses generated in the ignition coil by the action of the breaker points, produces a visual indication of the revolutions per minute of the engine and also produces an electrical output signal representing this value. The electrical signal produced by the engine tachometer 53 is fed to a strip chart recorder 5. A spark advance indicator 57 is connected to the engine scope 49 to produce a visual display of the basic timing of the engine and indicate the total spark advance.

The Maxwell dynamometer 21 has a tachometer 59 producing a signal proportional to the speed at which the rollers 23 are driven, a tachometer 61 producing a signal proportional to the speed at which the rollers 25 are driven, and a transducer 63 which produces an output signal proportional to the torque being absorbed or transmitted by the motor of the dynamometer 21. The dynamometer 21 has a third tachometer 65 which, like the tachometer 59 produces an output signal proportional to the speed at which the rollers 23 are driven. The output signal produced by the tachometer 65 is applied to the strip chart recorder 55. The strip chart recorder 55 thus receives a signal proportional to the wheel speed of the vehicle and a signal proportional to the engine speed of the vehicle. The strip chart recorder 55, when it is actuated, produces a chart with two traces, one which represents the engine speed versus time and the other which represents the wheel speed versus time over the same period. From the recording done by the strip chart recorder 55, the engine speed can be compared with the rear wheel speed and the operation of the vehicle transmission can be analyzed. The output signal from the tachometer 65 is also fed to a dynamometer lift cutout circuit 67, which in response to receiving a signal from the tachometer 65 prevents the dynamometer 21 from raising its wheel lift. This circuit prevents the accidental raising of the dynamometer wheel lift when the wheels of the vehicle are turning on the rollers of the dynamometer 21. The output signal of the tachometers 59 and 61 are applied to an averaging circuit 69, which produces an output signal proportional to the average of the output signals of the tachometers 59 and 61, and representing the average wheel speed of the vehicle. No averaging is needed in the strip chart recording operation because in this operation both rear wheels will be driven at approximately the same speed. The output signal from the transducer 63 representing the torque adsorbed or transmitted by the dynamometer motor and the output signal of the averaging circuit 69 representing the wheel speed of the vehicle are fed to a horsepower meter 71. In response to these signals the horsepower meter 71 produces a visual indication of the horsepower transmitted between the vehicle wheels and the dynamometer 21. The output signal from the tachometer 59 and the output signal of the tachometer 61 representing the right and left wheel speeds are fed to a balance meter 73 which provides a visual indication of the difference in speeds represented by the output signals of the tachometers 59 and 61. Thus the balance meter 73 produces an indication representing the difference in speed between the right and left vehicle wheels. The balance meter 73 connected in this manner can be used to provide an indication of the braking balance between the wheels, the balance of horsepower transmitted to the rear wheels and the balance of parasitic horsepower absorbed by the wheels. The output signal of the averaging circuit 69 is also fed to an m.p.h. meter 75 which produces a visual indication of the speed represented by the output signal of the averaging circuit 69 and thus a visual indication of the wheel speed. The output signal of the averaging circuit 69 is also fed to a rate meter 77 which by means of a resistor and capacitor network measures and indicates the rate of change of the output signal of the averaging circuit 69. The indication of the rate meter 77 will therefore be a measure of the acceleration of the wheels of the vehicle.

A tube 79 is connected to sample exhaust from the exhaust pipe of the engine 47. The tube 79 feeds a sample of the exhaust gas to an exhaust gas analyzer 81, which measures the percentage of combustibles in the exhaust gas and produces a visual indication of this measurement. A vacuum gauge 83 is connected to measure the vacuum at the intake manifold of the engine 47 and produces a visual indication of this measurement. A volt amp tester 85 is connected to measure the generator current and to measure the voltage between the regulator battery terminal and ground. The volt amp tester 85 is used to provide an indication of the regulated generator output amperage and voltage and also an indication of the amperage when the cutout relay of the regulator opens and the voltage at which it closes. The volt amp tester 85 is also used to determine the cranking battery voltage.

A flow meter 87 is connected by means of fuel lines 89 and 91 between the fuel pump and the carburetor of the engine 47 to measure the rate of fuel flow. A fuel pressure guage 93 is connected to the fuel line between the fuel pump and the carburetor to measure the fuel pump pressure. When the fuel flow meter 87 is connected to the fuel system it, together with the fuel lines 89 and 91, replaces the regular fuel line between the fuel pump and the carburetor.

The engine scope 49, the spark advance indicator 57, the volt amp tester 85, the manifold vacuum guage 83, the fuel flow meter 87, and the fuel pressure guage 93 are all mounted on the instrument carriage 33 and thus are adapted to be connected to the engine of a vehicle having its rear wheels engaged by the rollers of the dynamometer 21. The engine tachometer 53 and the exhaust gas analyzer are both mounted in the instrument and control panel 37 and are thus adapted to be connected to the power plant of a vehicle having its rear wheels engaged by the rollers of the dynamometer 21. The strip chart recorder 55, the balance meter 73, the horsepower meter 71, the m.p.h. meter 75 and the rate meter 77 are also mounted in the instrument and control panel 37.

Figure 3:
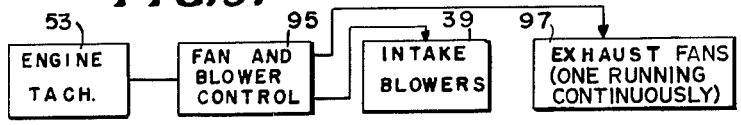
FIG. 3 is a block diagram illustrating the ventilation control system for the diagnostic bay in accordance with the present invention.

The output signal from the engine tachometer 53 is also fed to a fan and blower control 95, which controls the rate air is exhausted from and fresh air is brought into the bay. The block diagram of FIG. 3 illustrates how the fan and blower control 95 operates. The ventilation system is provided with two exhaust fans 97 which exhaust air from the test bay through the ducts 15 and 19. One of the exhaust fans runs all of the time and the other is controlled automatically in response to the output signal from the engine tachometer 53. When the engine tachometer 53 is not producing an output signal, the fan and blower control 95, in response to this zero output signal of the engine tachometer 53, runs the intake blowers 39 at half speed and maintains the automatically controlled exhaust fan shut off. When the engine tachometer 53 produces an output signal the fan and blower control 95, in response to this signal, will operate the intake blowers at full speed and will maintain the automatically controlled exhaust fan turned on. In this manner both of the exhaust fans 97 are run when the engine of the vehicle under diagnosis is being run under test with the engine tachometer 53. During other parts of the testing, when the engine of the vehicle is not running under test and less air exhaustion is needed, one of the fans 97 is automatically shut off. The intake blowers 39 are automatically run at full speed only when both of the fans 97 are being operated, thus providing an increased supply of temperature-conditioned air when both of the exhaust fans 97 are running. Thus the amount of air being exhausted from the diagnostic bay and the amount of fresh air being brought into the diagnostic bay are automatically increased when the engine of a vehicle is being run under test in the diagnostic bay.

The above described system is a specific embodiment of the present invention, and many modifications may be made thereto without departing from the spirit and scope of the invention, which is defined in the appended claims.

What is claimed is:

1. An automotive diagnostic system comprising means defining an automotive vehicle driveway, a test station on said driveway, means defining an enclosure over said driveway and said test station, testing means to test an automotive vehicle at said test station, ventilation means operable to exhaust air from said enclosure, means at said test station adapted to be connected directly to the engine of the vehicle at said test station to sense the running of such engine and produce an output signal whenever such engine is running both when the transmission of such vehicle is engaged and when the transmission of such vehicle is disengaged, and means responsive to said signal to cause said ventilation means to exhaust air from said enclosure at an increased rate whenever said signal is being produced.

2. An automotive vehicle diagnostic system comprising means defining an automotive vehicle driveway, a test station on said driveway, means defining an enclosure over said driveway and said test station, testing means to test an automotive vehicle at said test station including an engine tachometer adapted to be connected to the engine of a vehicle at said station and operable to produce an output signal representing the rate at which such engine is running both when the transmission of such vehicle is engaged and when the transmission of such vehicle is disengaged, ventilation means operable to exhaust air from said enclosure, and means responsive to said signal to cause said ventilation means to exhaust air from said enclosure at an increased rate whenever said signal is being produced.

3. An automotive vehicle diagnostic system comprising means defining an automotive vehicle driveway, a test station on said driveway, means defining an enclosure over said driveway and said test station, testing means to test an automotive vehicle at said test station including an engine tachometer adapted to be connected to the engine of a vehicle at said test station and operable to produce an output signal representing the rate that such engine is running, first ventilation means normally blowing fresh air into said enclosure at a first rate and operable to blow air into said enclosure at a second rate higher than said first rate, second ventilation means normally shut off and operable to exhaust air from said enclosure, and means responsive to the output signal of said engine tachometer to cause said first ventilation means to blow air into said enclosure at said second rate and to cause said second ventilation means to exhaust air from said enclosure whenever said tachometer is producing an output signal.

4. An automotive vehicle diagnostic system comprising means defining an automotive vehicle driveway, a test station on said driveway, means defining an enclosure over said driveway and said test station, testing means to test an automotive vehicle at said test station including an engine tachometer adapted to be connected to the engine of a vehicle at said test station and operable to produce an output signal representing the rate that such engine is running, first ventilation means normally blowing fresh air into said enclosure at a first rate and operable to blow air into said enclosure at a second rate higher than said first rate, second ventilation means to continuously exhaust air from said enclosure, third ventilation means normally shut off and operable to exhaust air from said enclosure, and means responsive to the output signal of said engine tachometer to cause said first ventilation means to blow air into said enclosure at said second rate and to cause said third ventilation means to exhaust air from said enclosure whenever said tachometer is producing an output signal.

References Cited by the Examiner

UNITED STATES PATENTS

| 1,959,918 | 5/34 | Hochbaum | 98—33 |
| 3,057,192 | 10/62 | Huffman | 73—117 |

FOREIGN PATENTS 1,180,189  6/59  France.

ROBERT A. O'LEARY, *Primary Examiner.*

MEYER PERLIN, *Examiner.*